Jan. 22, 1963  J. W. ERICKSON  3,075,105
VENTILATING SYSTEM FOR DYNAMOELECTRIC MACHINES
Filed Nov. 12, 1958

WITNESSES:

INVENTOR
John W. Erickson
BY
ATTORNEY

Jan. 22, 1963  J. W. ERICKSON  3,075,105
VENTILATING SYSTEM FOR DYNAMOELECTRIC MACHINES
Filed Nov. 12, 1958  3 Sheets-Sheet 3

United States Patent Office 3,075,105
Patented Jan. 22, 1963

3,075,105
VENTILATING SYSTEM FOR DYNAMO-ELECTRIC MACHINES
John W. Erickson, East Aurora, N.Y., assignor to Westinghouse Electric Corporation, East Pittsburgh, Pa., a corporation of Pennsylvania
Filed Nov. 12, 1958, Ser. No. 773,506
3 Claims. (Cl. 310—57)

The present invention relates to an improved ventilating system for dynamoelectric machines, and more particularly to a counterflow heat exchange ventilating system for totally enclosed fan-cooled motors.

Dynamoelectric machines, when in operation, generate heat which may cause damage to the machine by overheating the insulation of the windings. The heating of an electric motor during use largely determines the capacity of that motor. The temperature rise may be considerably reduced by providing cooling means for a motor, and in this manner, a physically small motor may be designed to perform the duty of a much larger motor. Thus, it is of very great importance that the temperature rise occurring during the operation of a motor or any dynamoelectric machine be limited as much as possible.

Different systems have been used whereby the cooling effect has been produced by means of utilizing cool external air. One method of cooling a dynamoelectric machine is simply to direct a stream of air through it by means of a fan secured to the rotating shaft. However, the conditions under which motors are often installed require that they be totally enclosed to prevent the admission of dirt, dust, lint, inflammables and other undesired matter. Such enclosures complicate considerably the problem of cooling. To overcome this heating problem in a totally enclosed motor, it is customary to provide an internal fan for circulating internal air in the interior of the machine and an external fan for circulating the external air over the heat transferring surfaces of the machine.

Present systems utilizing interior and exterior fans for circulating air utilize the end bracket as a heat exchanger, and the construction is such that interior and exterior air circulate in a parallel flow system. More effective cooling can be obtained, however, by using a counterflow heat exchange system in the range of temperatures in which dynamoelectric machines operate.

The mean temperature difference for both the parallel flow and counterflow systems between the cooler exterior air adjacent the heat exchanger and the interior air adjacent the heat exchanger is found by the following expression:

$$\Delta t_m = \frac{\Delta t_a - \Delta t_b}{\log_e \frac{\Delta t_a}{\Delta t_b}}$$

where $\Delta t_m$ equals mean temperature difference, $\Delta t_a$ equals the larger and $\Delta t_b$ equals the smaller of the temperature differences at the two ends of the heat exchanger.

The rate of heat transfer is found by the following expression:

$$q = AU\Delta t_m$$

where $q$ equals rate of heat transfer, $A$ equals area of the heat transfer surface and $U$ equals the heat transfer coefficient.

The values of $A$ and $U$ are the same for both a counterflow system and a parallel flow system in a given machine. Thus, it can be seen that the rate of heat transfer is proportional to the mean temperature difference.

Between the same temperature limits, the mean temperature difference for counterflow will always be greater than for parallel flow. Thus, it will be obvious that for a given area of heat transfer surface, the rate of heat transfer will be greater for counterflow than for parallel flow systems.

In present motor constructions, interior air is drawn toward the end bracket and radially outward. Thus, the hottest air at the lowest pressure is at the armature. It is desirable to provide the coolest air at the highest pressure at the armature. A motor construction directing air toward the heat exchange surface and radially inward would provide a counterflow heat exchange system and at the same time direct the coolest air at highest pressure toward the armature.

It is, therefore, the principal object of the present invention to provide an improved ventilating system for a dynamoelectric machine which is so constructed as to provide a counterflow heat exchange system.

Another object of the invention is to provide an improved ventilating system for a dynamoelectric machine utilizing a heat exchanger and a counterflow heat exchange system.

A further and more specific object of the invention is to provide an improved ventilating system for a dynamoelectric machine utilizing a heat exchanger and a baffle arrangement for directing interior armature cooling air toward the heat exchanger and radially inward, and exterior air toward the heat exchanger and radially outward.

Other objects and advantages of the invention will be apparent from the following detailed description, taken in connection with the accompanying drawings, in which.

Figure 1:
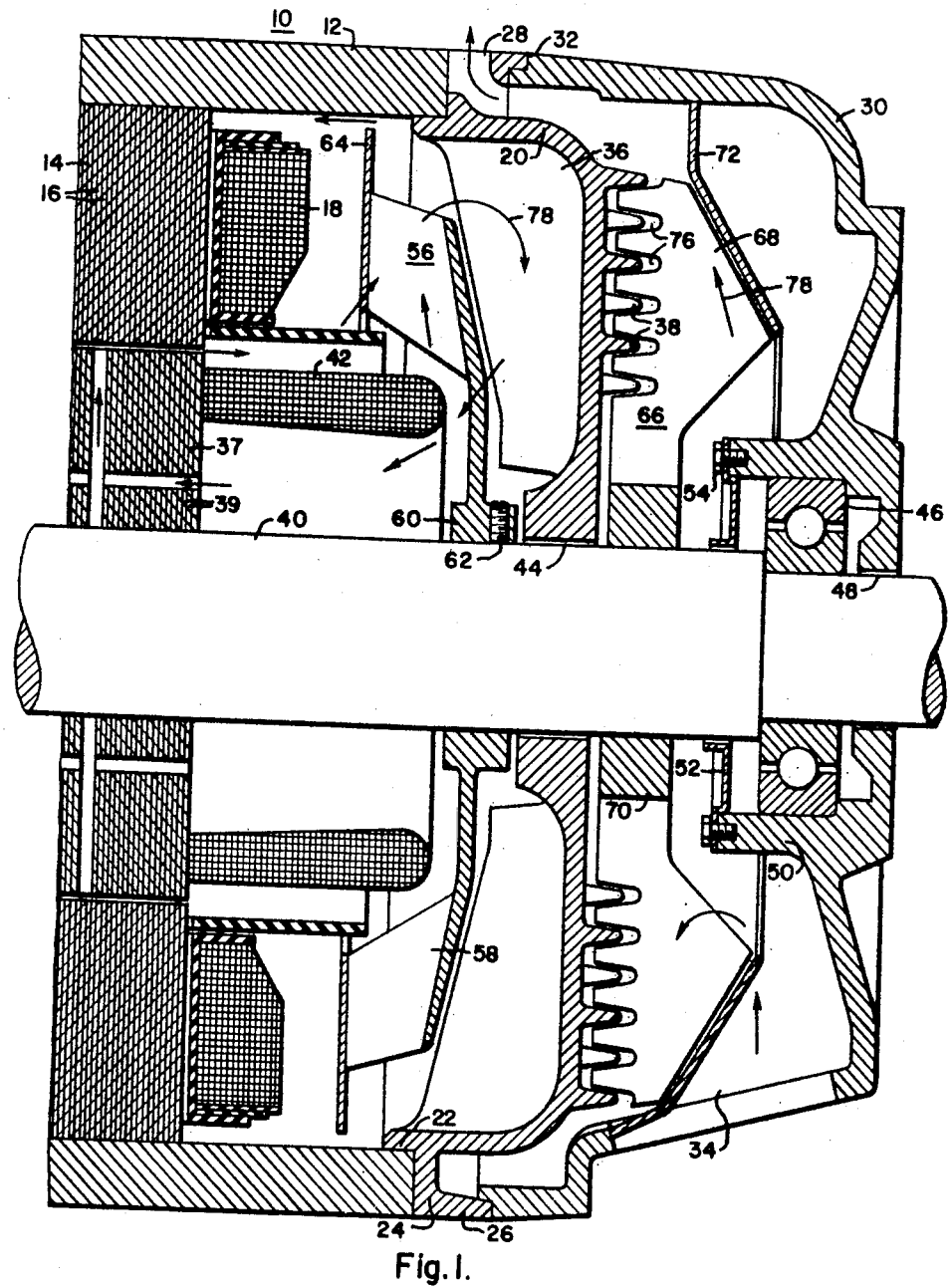
FIGURE 1 is a longitudinal section of one end of a dynamoelectric machine embodying the invention.

Referring now to FIGURE 1, the invention is shown embodied in a dynamoelectric machine 10 having a generally tubular stator frame 12 which surrounds and supports a stator member 14, including a plurality of laminations 16 of magnetic material adapted to be excited by a winding 18. This tubular frame 12 is closed at one end by a heat exchanger 20 and at its other end by a conventional end bracket, not shown. The heat exchanger 20 may be secured to the frame 12 in any suitable manner as by a rabbet fit, as shown at 22. An L-shaped peripheral ring 24 is formed integral with heat exchanger 20 having one leg 26 extending outwardly toward the end of the machine. Portions of ring 24 are cut away to provide air discharge openings as at 28 to serve as exhaust ports for coling air. An end bracket 30 is secured to ring 24 of heat exchanger 20 by any suitable means, such as a rabbet fit shown at 32. The end bracket 30 has a large air inlet opening 34 to admit exterior air. The heat exchagner 20 has on its interior side adjacent the stator frame 12 a plurality of radially extending fins 36 which constitute heat absorbing means. On its exterior side, it has a plurality of circumferentially aligned and radially spaced heat radiating fins 38.

The rotor comprises the core structure 37 including a plurality of laminations 39 of magnetic material mounted on the shaft 40 carrying windings 42. The shaft 40 extends through a central opening 44 in heat exchanger 20 and is journaled in the bearing 46 carried by the end bracket 30. The bearing 46 may be of any suitable type as, for example, a ball bearing, as shown. The shaft, if desired, may be extended to pass through central opening 48 in end bracket 30. The heat exchanger 20 is secured to the stator frame 12 in any suitable manner to make a tight joint therewith. The end bracket 30 has a central bearing bracket 50 in which is mounted the bearing 46. A rear bearing cap 52 encloses the bearing 46 and is secured to the bearing bracket 50 in any suitable manner, as, for example, by screws 54.

In order to provide for ventilating the machine thus far described, a fan 56 is provided having a plurality of blades 58 and a hub portion 60 mounted on shaft 40 for rotation therewith. The fan 56 may be secured to the shaft in any suitable manner, as, for example, by a set screw 62 threaded radially through hub 60, as shown. The fan 56 circulates internal air in the interior of the motor. In the embodiment shown in FIG. 1, an annular plate 64 is secured to the fan blades 58 and extends radially outward toward the interior surface of stator frame 12. The annular plate 64 serves as a baffle to restrict the flow of air toward the interior of the stator frame 12 and to direct the interior air toward the radial fins 36 of the heat exchanger 20. An external fan 66 having blades 68 and a hub portion 70 mounted on shaft 40 for rotation therewith is provided for circulating external air over the heat transferring surfaces of the machine. The fan 56 is mounted on the shaft 40 intermediate the end turns of rotor winding 42 and the heat exchanger 20. Fan 66 is mounted on the shaft 38 in the space between end bracket 30 and heat exchanger 20. An annular baffle member 72 is secured to the inner surface of end bracket 30 and serves as a guide between incoming and outgoing air. The annular baffle member 72 directs incoming air toward the exterior surface of heat exchanger 20 and thence radially outward through discharge openings 28. Blades 68 of fan 60 lie closely adjacent the outer surface of heat exchanger 20 and overlap fins 38. However, fan blades 68 are provided with a plurality of notches 76 which mesh with fins 38. The fins 38 are arcuate-shaped segments of circles concentric with the shaft 40 and may be positioned in circumferentially arranged rows and radially aligned columns. The exterior fins 38 on heat exchanger 20 and the cooperating fan 66 are more fully described in my copending application Serial No. 705,582, filed December 27, 1957, and assigned to the Westinghouse Electric Corporation. While a particular form of exterior fan and cooperating fins is shown and described, it will be understood that other and different fin and fan systems may be used.

Figure 2:
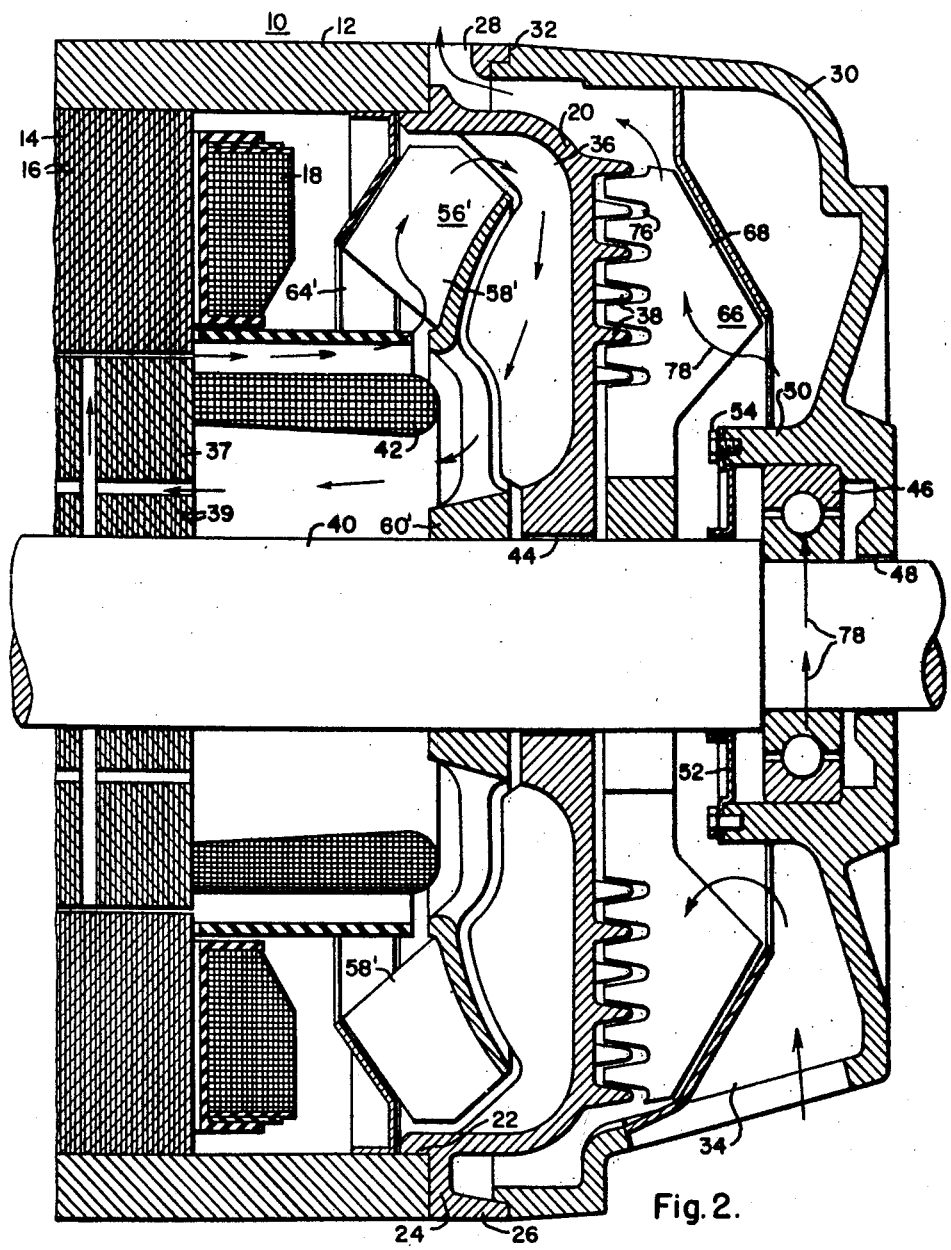
FIG. 2 is a longitudinal section similar to FIGURE 1, illustrating a modification of the embodiment shown in FIGURE 1.
Figure 4:
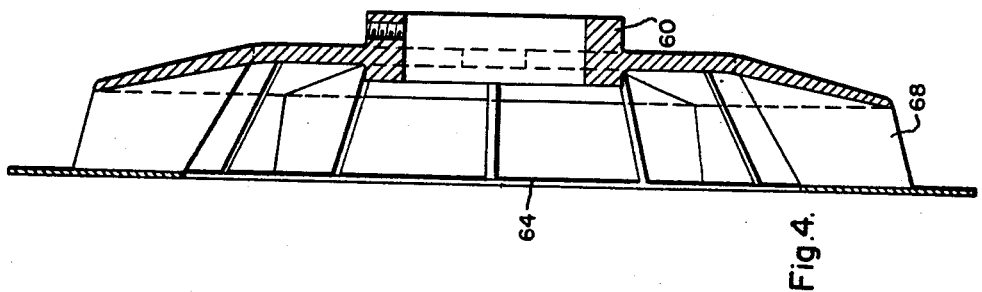
FIG. 4 is a cross-sectional view of the fan shown in FIG. 3 taken on line IV—IV thereof.
Figure 3:
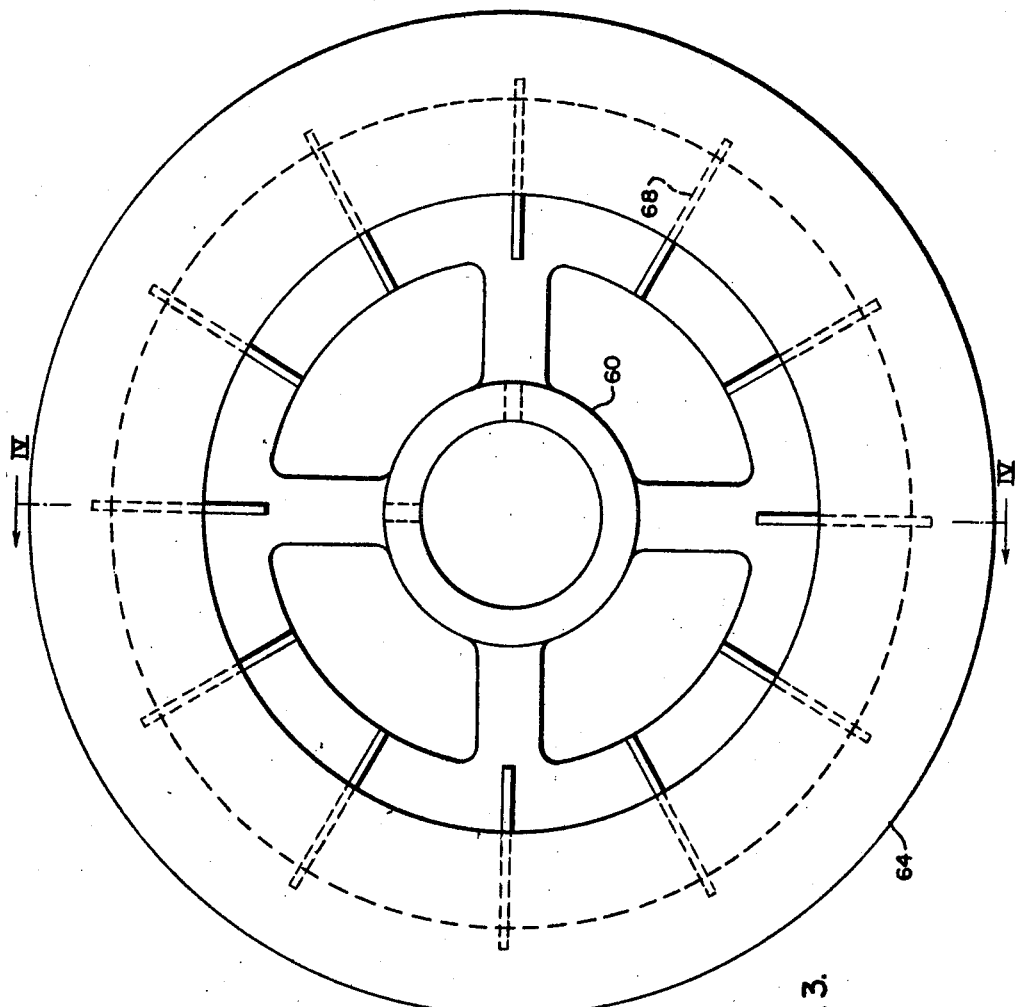
FIG. 3 is a rear elevational view showing the fan and interior baffle of the FIGURE 1 embodiment of the invention.

Referring now to the embodiment of the invention illustrated in FIG. 2, the machine illustrated is identical to the FIG. 1 embodiment with the exception of the interior baffle and the interior fan. Reference numerals used to identify the various elements in FIG. 2 will be the same as for like elements in FIG. 1. For purposes of simplification and to avoid unnecessary repetition, the FIG. 2 embodiment will be described in detail only insofar as it is necessary to point out the differences between the FIGURE 1 and FIGURE 2 embodiments. The invention is shown embodied in a dynamoelectric machine 10 having a tubular stator frame 12 which surrounds and supports a stator member 14 which is adapted to be excited by a winding 18. The stator frame is closed at one end by a heat exchanger 20 and at its other end by a conventional end bracket, not shown. The heat exchanger may be secured to the tubular frame in any suitable manner as by a rabbet fit, as shown at 22. The construction and securing means of the end bracket 30 are the same as that shown in FIG. 1. The rotor comprises a core structure 38 carrying winding 42 and is mounted on shaft 40. Shaft 40 is journaled in bearing 46 which is carried by bearing bracket 50. Bearing bracket 50 is enclosed at the rear by a rear bearing cap 52. Fan 66 is mounted on shaft 40 between the heat exchanger and end bracket 30. Fan blades 68 of fan 66 are notched as at 76 to receive circumferentially aligned fins 38. Mounted on shaft 40 interiorly of heat exchanger 20 is a fan 56' having a plurality of blades 58' and a hub portion 60' mounted on shaft 40 for rotation therewith. The hub 60' may be secured to shaft 40 in any suitable manner as by a press fit or set screws, not shown. An annular interior baffle plate 64' is secured to the interior surface of the tubular frame 12 adjacent the fan 56' and extends radially and longitudinally inward. Baffle plate 64' restricts the flow of air inwardly of the frame toward the stator member 14 and directs the interior air toward the heat exchanger and radially inward.

In operation, the embodiments in FIG. 1 and FIG. 2 are substantially the same. The blades of fan 56 or 56' will produce an internal air stream which is drawn through the machine, and the baffle 64 or 64' will deflect the air toward the heat exchanger and circulate the interior air in the direction shown by the arrows 78 against the heat exchanger and cause it to flow in a clockwise direction as seen in FIGS. 1 and 2. Some of the air will circulate through the longitudinal ventilation apertures in the rotor core as well as through the radial ventilation openings as shown by the arrows. The fins 36 and 36' will absorb most of the heat from the internally circulated air and transfer it through the external fins 38 to the air surrounding the outer surface of the heat exchanger 20 by radiation. This heat is rapidly carried from the bracket 20 by outer fan 66 which is arranged to drive a large volume of exterior air through opening 34 in end bracket 30 and then force the same radially outward through ventilating passages or openings 28. The exterior air will flow in a radially outward direction along the surface of the heat exchanger and thereby form a counterflow system in this region. It will be seen that the interior air along the region of the heat exchanger surface flows radially inward. Thus, the exterior air and interior air are flowing in opposite directions.

It will now be apparent that a new type of ventilating system for a dynamoelectric machine, particularly of the totally enclosed type, has been described which provides greater cooling capacity. Greater cooling capacity is derived from the new counterflow heat exchange system since for a given area of heat exchange surface the rate of heat transfer will be greater for a counterflow than for the usual parallel flow system. The new counterflow ventilating system utilizes the baffles to establish the counterflow of interior and exterior air as well as to direct the coolest air at highest pressure toward the armature where it is most desired. Another advantageous result of the construction of the new ventilating system is that no pressure difference over the bearing is created, as in presently used systems, thus preventing dirt from being forced into the bearing. The construction is simple and economical, and provides easy access to the front end of the motor and the commutator end.

Although certain preferred embodiments of the invention have been shown and described for the purpose of illustration, it will be understood that various other embodiments and modifications are possible within the scope of the invention. For example, the interior baffle may have openings therein so that part of the air may be directed toward the stator while the remainder is directed into the counterflow ventilating system. It is to be understood that the invention is not limited to the specific details or construction shown, but in its broadest aspects, it includes all equivalent embodiments and modifications within the scope of the invention.

I claim as my invention:

1. In a fan-cooled dynamoelectric machine including a stator core having windings thereon and having a tubular stator frame, an end bracket including an air inlet opening and an air discharge opening and a rotatable shaft having a rotor core and rotor windings thereon extending through a central opening in said end bracket; a ventilating system comprising a heat exchanger secured intermediate said end bracket and said shaft frame and enclosing said tubular frame at its end, said heat exchanger having radially extending, heat absorbing fins on its inner surface and heat radiating means on its outer surface, a first fan blade secured on said shaft intermediate said end bracket and said heat exchanger, a second fan blade secured on said shaft within said stator frame exteriorly of said stator windings adjacent said heat exchanger, annular baffle means closely adjacent but spaced from the periphery of the interior of said stator frame and intermediate said stator windings and said second fan blade for directing interior air in said machine toward said heat exchanger and radially inward, and an annular baffle secured within said end bracket and extending radially inward for directing exterior air from said air inlet opening toward said heat exchanger and radially outward toward said discharge opening, whereby a counterflow heat exchange system is established.

2. In a fan-cooled dynamoelectric machine including a stator core having windings thereon and having a tubular stator frame, an end bracket including an air inlet opening and an air discharge opening and a rotatable shaft having a rotor core and rotor windings thereon extending through a central opening in said end bracket; a ventilating system comprising a heat exchanger secured intermediate said end bracket and said stator frame and enclosing said tubular frame at its end, said heat exchanger having heat absorbing fins on its inner surface and heat radiating fins on its outer surface, a first fan blade secured on said shaft intermediate said end bracket and said heat exchanger, a second fan blade secured on said shaft within said stator frame adjacent said heat exchanger and exteriorly of said stator and rotor windings, and an annular plate secured to said fan blade on the side of said fan blade remote from said heat exchanger and extending radially outward of said fan blade toward the inner periphery of said tubular frame and in close proximity thereto for directing interior air in said machine toward said heat exchanger and radially inward, and an annular baffle secured within said end bracket and extending radially inward for directing exterior air from said air inlet opening toward said heat exchanger and radially outward toward said discharge opening, whereby a counterflow heat exchange system is established.

3. In a fan-cooled dynamoelectric machine including a stator core having windings thereon and having a tubular stator frame, an end bracket including an air inlet opening, an air discharge opening and a rotatable shaft having a rotor core and rotor windings thereon extending through a central opening in said end bracket; a ventilating system comprising a heat exchanger secured intermediate said end bracket and said stator frame and enclosing said tubular frame at its end, said heat exchanger having internal heat absorbing fins on its inner surface and external heat radiating fins on its outer surface, a first fan blade secured on said shaft intermediate said end bracket and said heat exchanger, a second fan blade secured on said shaft within said stator frame adjacent said heat exchanger and exteriorly of said stator and rotor windings, means closely adjacent but spaced from the inner periphery of said stator frame intermediate said stator windings and said second fan blade for directing interior air in said machine toward said heat exchanger and radially inward, and means for directing exterior air toward said heat exchanger and radially outward, whereby a counterflow heat exchange system is established.

References Cited in the file of this patent

UNITED STATES PATENTS

| | | |
|---|---|---|
| 1,969,493 | Ansingh | Aug. 7, 1934 |
| 2,413,525 | Smith | Dec. 31, 1946 |
| 2,458,006 | Kilgore | Jan. 4, 1949 |

FOREIGN PATENTS

| | | |
|---|---|---|
| 321,505 | Italy | Oct. 6, 1934 |
| 360,659 | Italy | July 2, 1938 |
| 632,055 | Germany | July 2, 1936 |